Figure 2:
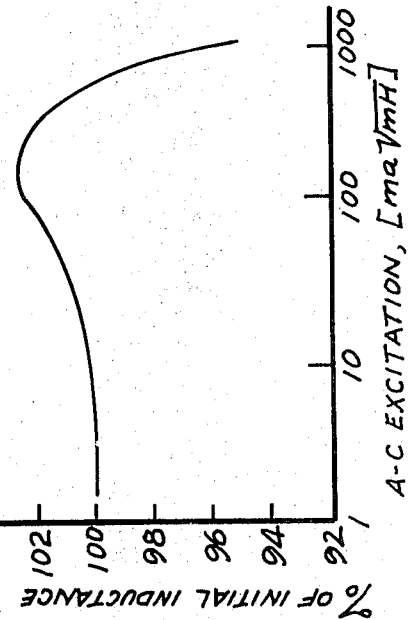

United States Patent

[11] 3,571,703

| | | |
|---|---|---|
| [72] | Inventor | Alfred Wallace Russell<br>3314 Rubio Crest Drive, Altadena, Calif. 91001 |
| [21] | Appl. No. | 766,845 |
| [22] | Filed | Oct. 11, 1968 |
| [45] | Patented | Mar. 23, 1971 |

[54] RESONANCE-TYPE INDUCTANCE OR CAPACITANCE METER
9 Claims, 2 Drawing Figs.

[52] U.S. Cl. .................................................. 324/59,
324/60, 324/78
[51] Int. Cl. ...................................................... G01r 27/00
[50] Field of Search .......................................... 324/57 (Z),
59, 60, 78 (I); 73/304 (C); 331/59, 65

[56] References Cited
UNITED STATES PATENTS

| | | | |
|---|---|---|---|
| 2,999,168 | 5/1961 | Henry.......................... | 324/78UX |
| 3,344,668 | 10/1967 | Schuck........................ | 73/304 |

*Primary Examiner*—Edward E. Kubasiewicz
*Attorney*—Lawrence Fleming

ABSTRACT: An electronic instrument measures properties of inductors by connecting the unknown inductor in an oscillating feedback loop and measuring the frequency of oscillation by means of a pulse-averaging discriminator. Feedback amplifiers are switched to measure inductance and self-oscillation frequency separately. Readout is by means of analog indicating instruments. A unique control circuit maintains the amplitude of the AC oscillation voltage across the unknown inductor at a constant low value, independently of the inductor's parameters, and permits the use of large shunt capacitors to minimize errors due to the self-capacitance of the inductor.

PATENTED MAR 23 1971

3,571,703

INVENTOR
ALFRED W. RUSSELL
BY Lawrence Fleming
AGENT.

RESONANCE-TYPE INDUCTANCE OR CAPACITANCE METER

This invention relates to electronic testing or measuring instruments for measuring the inductance and the self-resonant frequency of inductors, or the capacitance of capacitors. An instrument according to the invention indicates directly the parameter being measured, as on an indicating meter, and measures inductors with much less error due to self-capacitance (distributed capacitance) or to magnetic core properties, than prior instruments.

Figure 1:
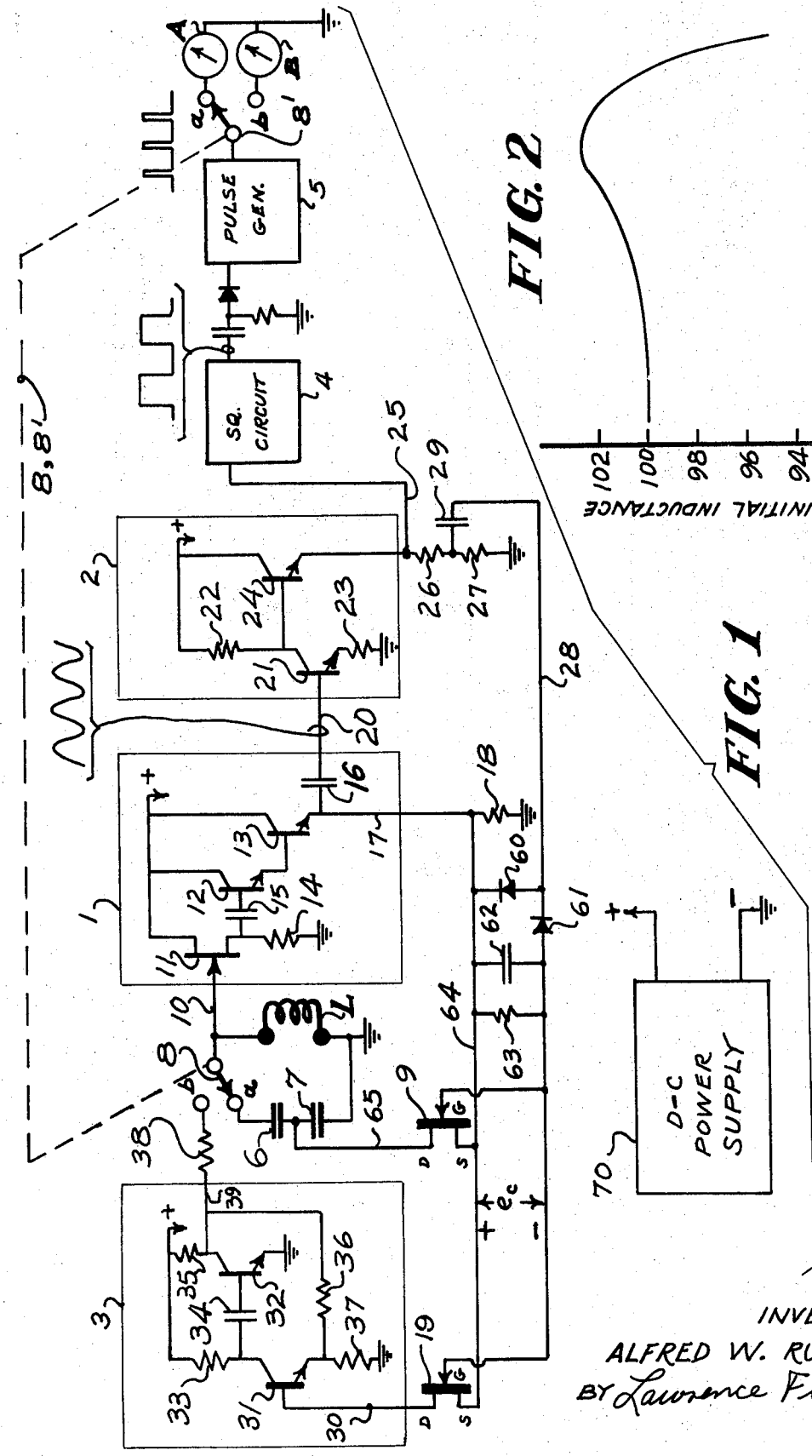

The description and operation of the invention may be further explained with reference to the drawing, wherein:

FIG. 1 is a simplified schematic diagram, partly in block form, of the electronic circuit of a form of the invention, and FIG. 2 is a graph illustrating certain properties of the invention.

FIG. 1, the circuit may comprise three wideband amplifiers, as are shown in the boxes 1, 2, 3. Additionally, a squaring circuit or limiter 4 may follow amplifier 2, and a pulse-generating circuit or one-shot multivibrator 5 may follow circuit 4 and have its pulse repetition rate controlled by circuit 4.

The output of pulse circuit 5 may be fed to indicating instruments A, B, whose indications are proportional to the average DC value of the pulses coming from circuit 5, i.e., to the average area under the pulses or to their repetition rate. The amplitude and duration of these pulses are, of course, maintained at constant predetermined values by known means in circuit 5, so that the average current fed to indicating instruments A, B is directly proportional to the repetition rate or frequency.

The unknown inductor to be measured is indicated at L. It may be connected across a pair of capacitors 6, 7 which are connected in series, forming a tank circuit of the type found in Colpitts oscillators. One side of this tank circuit goes to the input lead 10 of amplifier 1. An output terminal 17 of this same amplifier 1 is connected to a terminal, e.g., the source S, of a field-effect transistor or other suitable variable-impedance element 9. Signal power flows through element 9 and through conductor 65 to the junction between the capacitors 6, 7, thus completing a positive feedback loop and permitting oscillation to occur in the loop, which comprises tank circuit L, 6, 7, and amplifier 1, conductor 64, variable-impedance element 9, and conductor 65. The values of tank capacitors 6, 7 being fixed and known, the frequency of the oscillation will be a function only of the inductance of inductor L. The signal of this frequency is further amplified by amplifier 2, then converted into a square wave by circuit 4, then fed through the pulse generator 5 and to indicating instrument A or B. The indications of said indicating instruments will be proportional to the frequency, and one or the other may be calibrated so as to read inductance directly.

The reasons for showing two instruments A, B, and their purpose, will be explained presently.

The oscillating circuit loop described above contains, and is associated with, provisions for maintaining the amplitude of oscillation at a predetermined level. This level may approximately be of the order of 30 millivolts r.m.s. across the measured or unknown inductor L. The reason for controlling the amplitude at such a low level is to minimize errors in measuring inductors which have ferromagnetic cores. It is known that, with such inductors, the apparent inductance rises with increasing AC excitation, then falls again at still higher levels of excitation (FIG. 2). This effect produces substantial errors in inductance measurements made with prior art bridge and other instruments. Since the B-H curve of all ferromagnetic core materials is very nonlinear, the measured inductance of a coil wound on a core of such materials is a function of how far along this highly nonlinear curve the magnetizing force parameter (H, or ampere-turns) extends. The instrument of the present invention reduces such errors to an absolute minimum by electronically controlling the AC voltage across the unknown inductor by a unique control circuit, and by utilizing a variable frequency for effecting the inductance measurement—in contrast tp conventional bridges, which use a fixed measuring frequency, and induce substantial errors. In the instrument of the invention, the measuring frequency is a function of the inductance of the unknown inductor; with small inductors, the frequency is relatively higher, and perforce, the magnetizing current lower, and vice versa.

FIG. 2 shows a curve relating measured inductance to the magnitude of the AC excitation voltage applied by the measuring instrument or apparatus, for an inductor having a typical ferromagnetic core. Assume, for example, that an unknown inductor being measured has an inductance of approximately 1 millihenry and that the excitation applied across it, by the present instrument, is controlled automatically at 0.03 volts AC. Take also the fixed capacitance presented across it by the pair of capacitors 6, 7 (FIG. 1), as 0.1 microfarad, a value contemplated by the invention. The frequency of oscillation will then be, by the relation $$f = \frac{1}{2\pi\sqrt{LC}}$$

approximately 16,000 Hz. The reactance of the inductor L at this frequency is about 100 ohms, and hence the AC current through it 0.3 milliampere. This excitation, by the data of FIG. 2, is only about 1 percent of the value that would be required to produce an increase of 0.3 percent in initial inductance due to the B-H curve of the ferromagnetic core. It is seen, therefore, that the instrument of this invention is unusually precise.

The automatic amplitude control circuit of the invention may comprise rectifiers or diodes 60, 61, excited by signal voltage from the conductor 17 from amplifier 1, and the conductor 25 from amplifier 2. The rectifier circuit may further comprise load resistor 63 and signal filter capacitor 62 across the output of the diodes, in known manner.

AC signal voltage supplied to diodes or rectifiers 60, 61 comes from the potential difference between output terminal 17 of amplifier 1, and the output of amplifier 2, reduced by voltage divider 26, 27. The "high" side of the signal input to rectifiers 60, 61 is taken from the junction of impedances 26, 27, through a capacitor 29, and shown at conductor 28. The "low" side of said signal input is taken from the output 17 ("high" side of load resistor 18) of amplifier 1. It is a feature of the invention that the "low" or return side of the input to rectifiers 60, 61 is to a point such as output 17, which is at an oscillating signal potential with respect to ground, rather than to a signal ground itself. Applicant has found that this manner of connection has strong and unobvious advantages in the control of the oscillations of the loop described above. It permits a stable buildup of amplitude of oscillation regardless of the inductance or Q of the unknown inductor L, and permits the steady maintenance of such oscillations without any tendency toward the uncontrollable periodic condition of intermittent oscillation known as "blocking" or "squegging."

It will be observed, also, that the above-described manner of connection leaves the input terminals G and S of variable-impedance control elements 9 and 19 at the same DC potential when the DC rectified signal output $e_c$ is zero. This is the condition before the oscillations have had time to build up. When the G and S input terminals are at the same potential, the elements 9 and 19 will offer minimum resistance to signal current passing through them, as parts of the feedback loop, and so the loop gain will be at a maximum, facilitating the start and buildup of oscillations.

Elements 9 and 19 may be field-effect transistors, with terminals S, G, and D defining the source, gate, and drain, respectively.

Typical values of AC signal voltage with respect to ground may be: at conductor 17, 0.03 volt, at conductor 25, 4 volts, and at capacitor 29, 1 to 2 volts. A typical value of rectified DC control voltage $e_c$ may be of the order of 2.5 volts.

To continue with the description of the rectifying and amplitude control circuitry, the DC filtered output of rectifiers 60, 61, shunted by load resistor 63 and filter capacitor 62, is applied between electrodes of control elements 9, 10, e.g., sources S and gates G of field-effect transistors 9, 19, if such devices be chosen for this role. Element 9 has the property of behaving as a resistance or impedance which can be varied by a control potential, e.g., the drain D— source S path may constitute a resistance whose magnitude is controllable by varying the bias or potential between gate G and source S. Accordingly, the rectified control or bias voltage $e_c$ may bias the gate G of element 9 negatively with respect to its source S, and thereby increase the AC resistance effective between source S and drain electrode D. Since this S-D resistance is a part of the feedback path between output connections 17 and the junction between tank capacitors 6, 7, its resistance magnitude will determine the loop gain, and hence determine the amplitude of oscillation. The control action is as follows: if the oscillating amplitude increases, the signal voltage at conductor 25 will increase, and hence the control voltage $e_c$, derived from rectifiers 60, 61 will increase; $e_c$ will bias element 9 so as to increase the effective resistance between its electrodes S D; this will reduce the loop gain, and the oscillation amplitude will drop, and so on until a stable point is reached, which will be maintained.

Voltage divider 26, 27 provides a suitably large input voltage to he the squaring circuit or limiter 4, such as, 4 volts. The junction or tap, through capacitor 29, is chosen so as to provide an appropriate smaller voltage, such as 1 or 2 volts to operate the amplitude control elements 60—64. Divider 26, 27 may be of any known kind, such as transformer, inductive, or capacitive, as well as resistive.

Referring again to variable-impedance element 19 and amplifier 3, these are part of the provision for measuring the self-resonant frequency of the unknown inductor L. Amplifier 3, like amplifier 1, is noninverting, but in contrast has appreciable voltage gain. The input to amplifier 3 comes via conductor 30 through a field-effect transistor or other suitable variable-impedance control element 19. Signal input to element 19, and also control or bias input, comes from conductors 64 and 28, similarly to he the case of the control element 9.

For changing from inductance measurement to self-resonant frequency measurement, a switch 8, 8' may be provided, having two or more ganged sections. When the switch is in the position indicated $a$, the instrument of the invention operates to measure inductance in the manner heretofore described. The second section 8' of the switch is, in such operation, also in the position designated $a$, and connects the output of pulse circuit 5 to meter A. This meter A or indicating instrument may be calibrated in terms of inductance, and also in capacitance.

When the switch 8, 8' is thrown to position $b$, the unknown inductor L is connected to the output conductor 39 of amplifier 3 through a relatively high value resistor or other impedance 38, and capacitors 6, 7 are disconnected from it. Simultaneously, the other section of the switch, 8', disconnects the output of pulse generator 5 from indicating instrument A and connects it to instrument B. Instrument B may be calibrated directly in terms of frequency, so that it may read the self-resonant frequency of inductor L directly.

The importance of measuring the self-resonant frequency of an inductor may be briefly explained as follows: If $L_0$ is the inductance of an inductor at zero frequency, the fractional increase $\Delta L$ in measured inductance at a frequency $f$ which is low compared with its self-resonant frequency $f_r$ is approximately $$\frac{\Delta L}{L_0} = \omega^2 L_0 C_0 = \left(\frac{f}{f_r}\right)^2$$

where bridge $C_o$ is the self-capacitance of the inductor, and $\omega$ is $2\pi f$. Thus, if the frequency of measurement is one-tenth the resonant frequency, the measured inductance will be 1 percent high. To take an example of measuring an inductor having a self-resonant frequency $f_r$ of 3 kHz. (a common value) on a conventional impedance bridge having a measuring frequency of 1 kHz., the error will be ($\frac{1}{3}$)² or approximately 11 percent.

In the operation of the instrument of the invention where the switch 8, 8' is in position $b$, the inductor L is connected, for excitation, to the output conductor 39 of amplifier 3, through the high resistor or other appropriate impedance 38. If a resistor, this element may have a high impedance value, such as 1 megohm. The positive feedback loop which maintains oscillation comprises amplifier 1, conductors 17 and 64, element 10, and conductor 30 which acts as the input to amplifier 3. Automatic control of the amplitude of so oscillation is effected through rectifier and filter circuitry 60—64 and field-effect transistor or equivalent variable-impedance control element 10, similarly to the control via element 9 described above. When the amplitude of the signal at the output 17 of amplifier 1 increases, for example, the control voltage $e_c$ will increase, and thereby increase the resistance or impedance between terminals S and D of element 19, and this will operate to decrease the loop gain, and stabilize the level of oscillation at a predetermined value.

The oscillation, when switch 8 8' is in position $b$, will occur at the self-resonant frequency of inductor L (since nothing is connected across it except stray capacitance, which may be neglected), and this frequency will be readable on indicating instrument B, in accordance with the above-described functioning of amplifier 2 and circuits 4 and 5.

Examples of suitable circuitry for the amplifiers 1, 2, and 3 are shown in simplified form in FIG. 1, but it will be understood that the invention is not limited to these specific forms. In FIG. 1, the circuitry is shown in simplified form, the simplification consisting in omitting the DC bias circuits for the various transistors, for clarity of illustration. It will be understood that any suitable DC bias methods, such as emitter and base resistors, known to the art, may be employed without departing from the spirit of the invention. The drain and collector leads which are shown running to conductors marked "+" will be understood to be connected to a DC power supply such as is indicated at 70, FIG. 1. Since NPN transistors have been indicated, the power supply 70 is shown with its negative output grounded and its positive side marked "+, " to be connected to the corresponding "+" conductors in amplifiers 1, 2, and 3. Should PNP transistors or equivalent active elements be used, it will be understood that these polarities would be reversed, without departing from the invention.

Amplifier 1 typically has low or unity voltage gain, a high input impedance (such as many megohms), and a low output impedance (such as several ohms). It may comprise a field-effect transistor 11 in source-follower configuration with a source load resistor 14, coupled via a capacitor 15 to a bipolar transistor 12 in emitter-follower connection, followed by another emitter-follower 13. The output of follower 13 may have a load resistor 18 and be connected by a conductor 17 to he the rectifier and control circuitry 60—64.

Active circuit elements of any known type, such as electron tubes, may be employed to obtain the necessary amplifying and control properties in this and the other circuits; the invention is not restricted to the specific kinds of active elements illustrated.

Amplifier 2 may take its input via conductor 20 to the base of a transistor 21, which has an emitter resistor 23 and a collector load impedance 22, and is coupled to another transistor in emitter-follower configuration 24. The output conductor 25 from emitter-follower 24 may be connected to voltage divider 26, 27, as previously described. Amplifier 2 may have a voltage gain of from 1 to a few orders of magnitude, a moderate input impedance, and a relatively low output impedance.

Amplifier 3 may suitably employ a transistor 31 connected as a voltage-gain stage utilizing impedances 33, 37, coupled to a second transistor stage 32 having a collector load resistor 35, with a feedback resistor 36 from the collector of transistor 32 to the emitter of transistor 31. The voltage gain of the pair will be approximately $$\frac{R_{36} + R_{37}}{R_{37}}$$

where $R_{36}$ and $R_{37}$ are the impedances of elements 36 and 37 respectively.

Output conductor 39 of amplifier 3, when switch 8, 8' is in position b, feeds the "high" side of unknown inductor L through a high resistance or impedance 38, as indicated earlier, the impedance 38 having a magnitude desirably high compared to the self-resonant impedance $L\omega Q$ of inductor L, but low enough to supply adequate signal current to a maintain oscillation.

It will be understood that the amplifiers 1, 2, 3 may be of any types of circuitry and construction that will provide the requisite gains and impedances; integrated circuit operational amplifiers, with suitable feedback connections, may for example be employed. Other modifications, such as the use of integrated circuits for circuits 4, and 5 will be apparent within the scope of the invention.

The instrument of the invention may be used to measure capacitance as well as inductance, by connecting a known inductance at L, FIG. 1, and connecting the unknown capacitance across it, as will be evident to those skilled in the art.

I claim:

1. An impedance measuring instrument comprising:
   amplifying means having an input terminal and a pair of output terminals;
   a positive feedback path including an unknown inductor and a capacitive network, said inductor and said network being connected in parallel, said feedback path connected intermediate said output and input terminals to produce oscillations;
   a variable impedance element, said impedance element connected in said feedback path intermediate said output terminals and said capacitive network to regulate the amplitude of said oscillations to a relatively low and constant value; and
   indicating means connected to one of said output terminals for indicating the frequency of said oscillations, said means being calibrated in terms of inductance.

2. An instrument according to claim 1, wherein said indicating means comprises:
   a square wave producing circuit fed from one of the output terminals of said amplifying means and feeding a pulse averaging discriminator; and
   an indicating instrument fed from said discriminator.

3. An instrument according to claim 1, further comprising a rectifier circuit connected intermediate said output terminals and said variable impedance element and wherein:
   said amplifying means comprises a first and a second amplifier;
   said first amplifier supplying power through the other of said output terminals to start and to maintain oscillations in said path; and
   said second amplifier supplying additional signal voltage through said one of said output terminals to said rectifier circuit controlling said variable impedance element, whereby the buildup and maintenance of the amplitude of said oscillations is made stable.

4. An instrument according to claim 3, wherein: a capacitor is connected between said one of said output terminals and said rectifier circuit, said variable impedance element being bias controlled by the output of said rectifier circuit.

5. An instrument according to claim 1, wherein said amplifying means comprises a first and a second amplifier;
   said first amplifier having said input terminal being connected to provide power gain through the other of said output terminals to said path;
   said second amplifier being connected to amplify further the output signal of said first amplifier to control said variable impedance element and to feed said indicating means through said one of said output terminals;
   said instrument further comprises a third amplifier having an input and an output;
   said input connected to said output terminals adapted to maintain oscillations in said unknown inductor in its self-resonant state; and
   switch means for coupling the output of said third amplifier to said inductor and said input terminal while decoupling said network from said unknown inductor.

6. An instrument according to claim 5, wherein: said indicating means includes a pair of indicators, said switch means coupling one of said indicators to said one of sa said output terminals.

7. The structure of a claim 6, one of said indicators being calibrated in terms of self-resonant frequency, and the other of said indicators being calibrated in terms of inductance.

8. An instrument according to claim 5, further comprising: a further variable impedance element connected in said feedback path intermediate said third amplifier and said output terminals.

9. An instrument according to claim 1, wherein said variable impedance element is a field-effect transistor.